United States Patent [19]

Fujita et al.

[11] Patent Number: 4,660,954

[45] Date of Patent: Apr. 28, 1987

[54] AUTOMATIC FOCUSING DEVICE EQUIPPED WITH CLOSE-UP RANGE FOCAL CONTROL

[75] Inventors: Susumu Fujita; Masahiko Konagaya, both of Nishinomiya, Japan

[73] Assignee: Fuji Photo Film Co., Ltd., Kanagawa, Japan

[21] Appl. No.: 784,520

[22] Filed: Oct. 4, 1985

[30] Foreign Application Priority Data

Dec. 22, 1984 [JP] Japan ............................. 59-271549

[51] Int. Cl.$^4$ ............................................. G03B 3/00
[52] U.S. Cl. ..................................................... 354/403
[58] Field of Search ................................ 354/400-409, 354/195.12

[56] References Cited

U.S. PATENT DOCUMENTS 4,505,566 3/1985 Noguchi ..................... 354/400
4,540,264 9/1985 Daitoku et al. .................. 354/400
4,582,411 4/1986 Ohmura et al. .................. 354/403

FOREIGN PATENT DOCUMENTS

81/02067 7/1981 PCT Int'l Appl. .

*Primary Examiner*—W. B. Perkey
*Attorney, Agent, or Firm*—Koda and Androlia

[57] ABSTRACT

A system for focusing the subject which is beyond the close-up range limit of a camera lens including a distance detector detecting the distance between the lens and the subject, a focusing device for setting the lens at a focal point based upon the signal from the distance detector, an optical correction device for providing an auxiliary lens between the lens and correcting the light path of the light entering through the lens, and a distance remeasuring device for remeasuring the distance between the subject and the lens to shift the lens at the focal point.

2 Claims, 4 Drawing Figures

AUTOMATIC FOCUSING DEVICE EQUIPPED WITH CLOSE-UP RANGE FOCAL CONTROL

BACKGROUND OF THE INVENTION

1. Field of the Invention

The present invention relates in general to an automatic focusing mechanism of a camera, and more particularly to an automatic focusing device having a close-up focal control for focusing a subject which is closer than the short range shooting limit of the camera lens.

2. Prior Art

There are various types of automatic focusing mechanism in cameras. Of those, the systems used commonly and frequently are the types using the principles of triangulation. These systems set the camera lens at the focal point by receiving the light from the subject directly to a range finder or by projecting the flux of light to the subject from the range finder and then by receiving the reflected light from the subject by the above mentioned range finder.

Another system, that does not depend on the principles of trigonometrical survey, sets the lens at the focal point by focusing light from the subject into an image at C.C.D. through a single light receiving lens, etc., and then by detecting the space phase difference.

For any of the cameras provided with the automatic focusing devices as mentioned above, it is impossible to take a picture of the subject that is closer than the short range shooting limit set for the camera lens, due to the restrictions imposed on the camera, such as the helicoid of the camera lens, etc. Therefore, such cameras did not have the close-up range finding-focusing functions.

As mentioned above, the cameras provided with the conventional type automatic focusing devices have the disadvantage that it is impossible to take photographs of the subject extremely close and exceeds the short range shooting limit.

SUMMARY OF THE INVENTION

Accordingly, the present invention is intended to eliminate the disadvantages mentioned above.

The object of the present invention is to provide an automatic focusing device equipped with a close-up focusing function which is capable of automatically and continually switching the range finding-focusing function from the ordinary shooting state to the close-up shooting state when the subject is closer than the short range shooting limit.

More particularly, the object of the present invention is to provide an automatic focusing device which is capable of shooting a subject at an extra-close position without causing the photographer to be conscious of the fact that it is a close-up shot.

The above mentioned object of the present invention is accomplished via a unique structure for an autofocusing device including a range finding means, a range setting means for a camera lens, an optical correction means, and a means for remeasuring the distance.

In the above, the range finding means is provided with a detection unit for detecting whether or not the subject is at the position closer than the short range shooting limit of the camera lens. The range setting means moves the lens to the focal point by moving the camera lens according to the distance signal measured by the range finding means. The optical correction means for each optical system functions to insert the correcting lens to the camera lens by responding to the detection signal from the foregoing range finding means, that detects the subject being beyond the short range shooting limit. The optical correction means further functions to insert the optical wedge to at least correct the incident light path of the range finding optical system. The range remeasuring means remeasures the distance by responding to the detection signal which detects the passing of the short range shooting limit.

By means of the afore-mentioned construction, the automatic focusing device works to insert the correcting lens between the shooting lens and at least to correct the incident light path of the range finding optical system by responding to the detection signal which detects that the subject is closer than the short range shooting limit. Thereafter, the distance is remeasured, and by means of the signal for the result of the remeasuring, the shooting lens is moved to the focal point.

BRIEF DESCRIPTION OF THE DRAWINGS

The Figures show an embodiment of this invention, wherein.

DETAILED DESCRIPTION OF THE INVENTION

Hereunder, a detailed description of an embodiment of the present invention including its operation will be given with reference to the drawings attached.

Figure 1:
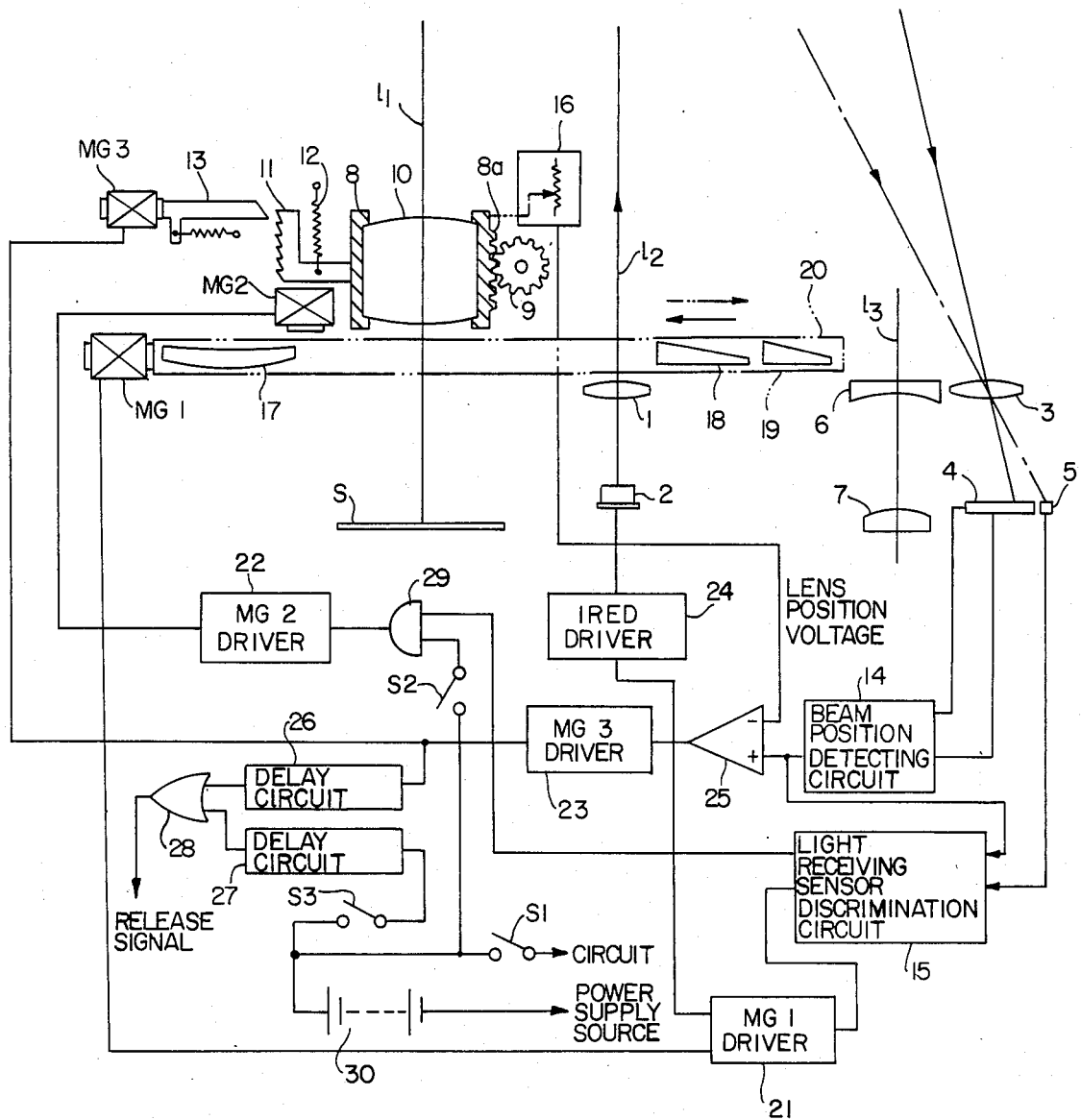
FIG. 1 is an overall structural view of an automatic focusing device according to the present invention.

FIG. 1 is an overall structural view of an automatic focusing device that enables close-up shooting via the present invention.

The Figure shows the state where, before entering in the focusing state that is effected when a release button (not shown in the Figure) is pressed, the camera lens 10 is attracted by repulsion type magnet Mg 2 and set up at the infinite distance position that is the normal position after a camera lens 10 which is linked with a shutter charge is brought in by a pinion 9 against a spring 12.

In this state, an anchoring pawl 13 is positioned to face the foregoing ratchet 11. The ratchet 11 is mounted on a lens frame 8, and the anchoring pawl 13 effect the engagement with the ratchet 11 against the spring force of a spring 12. Also, in the above, the anchoring pawl 13, facing the ratchet 11, is attached by a repulsion type magnet Mg 3.

Then, the electric current is fed to the release-time repulsion type magnet Mg 2. As a result, the camera lens 10 is released from the attraction, and brought out by means of the spring 12 into entering to the focusing state. When the camera lens 10 takes this state, the magnet Mg 2 is fed with the current, and the anchoring pawl 13 is released from the attraction. Thus, the anchoring pawl 13 comes to be engaged with the ratchet 1 1, stopping the camera lens at the position.

The detection of the focusing state of the camera lens 10 is made through checking if the voltage output from the lens position voltage generating circuit 16 becomes equal to the voltage corresponding to the lens setting distance. The lens position voltage generating circuit 16 is connected to the frame 8 of the camera lens 10, and causes sliding resistance variation by the movement of the frame of the frame 8 and generates the lens position voltage. The voltage corresponding to the lens setting distance varies depending on the signal from a position detecting sensor 4 that will be mentioned later.

The pinion 9 which moves the camera lens 10 to the infinite ∞ distance position through linkage with the shutter charge becomes free by a means (not shown in the Figure) during the release time. Accordingly, the pinion 9 in the free state during the release time does not obstruct the movement of the camera lens 10 during focusing.

At the back of the camera lens 10, a sliding frame 20 is disposed to slide to the right and left. The sliding frame 20 is provided with a close-up shooting correction lens is 17 for the camera lens 10, a correction prism 18 to correct the angle of incidence to a finder objective lens 6, and a correction prism 19 to correct the angle of incidence to a light receiving lens 3.

When the correction lens system formed of the above mentioned correction lenses 17, 18 and 19 in the sliding frame 20 retreats from the light path $l_1$ of the camera lens 10, from the finder light path $l_2$, and from the light receiving optical path $l_3$ through the linkage with the shutter charge, etc., the sliding frame 20 is attracted by the repulsion type magnet Mg 1 and engaged to be stopped.

On the other hand, when the sliding frame 20 is released from the attraction through the current supply to the magnet Mg 1, the close-up shooting correction lens system 17, 18, and 19 in the sliding frame 20 becomes aligned to the optical axes of the camera lens 10, etc., respectively, by means of the springs not shown in the Figure.

On the side of the optical axis of the camera lens 3, relative to the position of the foregoing light receiving lens 3, with a specified distance provided in between, a projection lens 1 and an infrared emitting diode 2 are disposed along the same axis and in parallel with the optical axis of the camera lens 10, in order to project the beam (light flux) to the shooting subject.

Behind the above mentioned finder objective lens 6, a finder eyepiece 7 is provided. Also, in the rear of the light receiving lens 3, and at the converging position for the reflected lights from subject which converge after passing through the foregoing light receiving lens 3, a position detecting sensor 4 for measuring distance is disposed as a light receiving element. The sensor is capable of, for example, outputting the position of the beam on the light receiving surface by converting it to the voltage.

Furthermore, at the position adjacent to the short range limit point in the direction along which the deviation of the light receiving spot is to be detected, a close range limit overrun sensor 5, such as a photodiode, is disposed. This sensor 5 detects the reflected light from the subject in case the subject becomes closer in position than the short range shooting limit of the camera lens 10.

The radiation of light from the above mentioned infrared emitting diode (IRED) 2 is effected as follows. When a power switch S1 connected to one of the electrodes of a battery 30 is brought to the ON position as the first step during pressing the release button, the respective circuit elements are supplied with the current, and an operation signal voltage is impressed from an IRED driver 24 to the infrared emitting diode (IRED) 2 to cause it to radiate and project the light to the subject.

Then, when the reflected light from the subject passes through the light receiving lens 3 and converges to the position detecting sensor 4, the signal output from the position detecting sensor 4 is input to a beam position detecting circuit 14. The output voltage from the beam position detecting circuit 14 is input to a received light sensor discrimination circuit 15, and from this circuit 15, the position detected light receiving signal is sent to an AND gate 29. Together with the ON signal of the camera lens start switch S2 as the second step accompanying the pressing of the release press button, the foregoing position detecting light receiving signal causes the AND gate 29 to operate. By this operation, through a Mg 2 drive 22, the magnet operation signal is sent to the repulsion type magnet Mg 2. As a result, the camera lens 10 is released from the attraction and engagement. Thus, the camera lens 10 starts to move to be brought to the focusing position from the infinite distance position.

Also, the output from the afore-mentioned beam position detecting circuit 14 is input, as the lens distance setting voltage, to a comparator 25, together with the lens position voltage that is the output from the previously mentioned lens position voltage generating circuit 16. When both voltages become equal, that is, when the moving camera lens 10 comes into a focused state through the Mg 3 driver 23, the magnet operation signal is sent to the repulsion manget Mg 3. As a result, the anchoring pawl 13 is released from engagement, thereby stopping the camera lens 10 at the focusing position.

Meanwhile, the signal from the Mg 3 driver 23 outputs the release signal from a delay circuit 26, through an OR gate 28. This release signal gets behind the operation signal to the repulsion magnet Mg 3. By this delayed release signal, the shutter release is effected after focusing is done by the camera lens 10.

Figure 2:
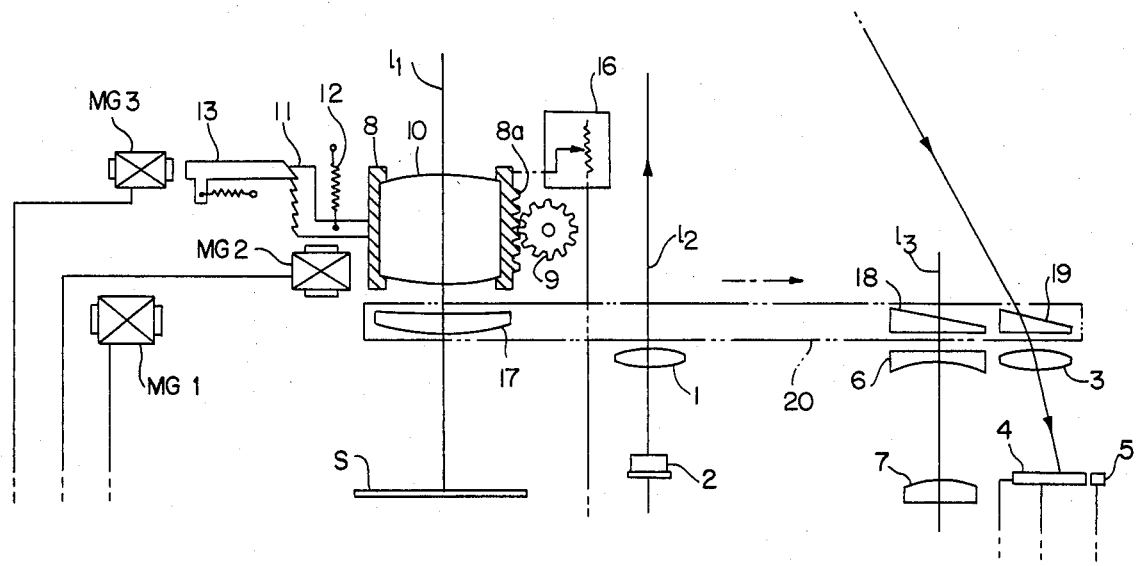
FIG. 2 is an operation diagram of a part of the structure shown in FIG. 1.

On the other hand, when the subject approaches the lens to be closer than the short range shooting limit of the lens, the reflected beams (light flux) from the subject passes through the light receiving lens 3 and coverge on the surface of the short range limit passing (overrun) sensor 5 adjacent to the position detecting sensor 4. The signal generated from the foregoing limit overrun sensor 5 is input to the received light sensor discrimination circuit 15, and from this circuit 15, the signal telling that the light is received by the short range overrun sensor 5 is sent to a Mg 1 driver 21. Then, from this Mg 1 driver 21, the magnet operation signal is sent to the repulsion magnet Mg 1. As a result, the sliding frame 20 with the correction lens 17 and the incidence angle correction prisms 18 and 19 which are the optical system for short disposed in the sliding frame 20 is released from attraction, and by means of a spring (not shown in the Figure) as shown in FIG. 2, the correction lens 17 and the incidence angle correction prisms 18 and 19 of the correction lens system are aligned respectively at their centers with the optical axes of the camera lens 10, the objective lens, etc.

The infrared emitting diode (IRED) 2 mentioned above emits light simultaneously when the power switch S1 is turned to the ON position. However, the circuit for the Mg 1 driver 21 is constructed as described below. When the magnet operation signal is output from the Mg 1 driver 21 to the repulsion magnet Mg 1, emission of light from the IRED 21 is stopped by the operation blocking signal output to the IRED driver 24. Then, after the magnet operation signal is generated for a specified short time is finished, the light is emitted again form the IRED 2. Thereafter, the power switch S1 is opened by the return of the release button to the original position, and the emission of light is stopped.

In other words, the infrared emitting diode (IRED) 2 is designed to work as follows: When taking a photograph, the infrared emitting diode IRED 2 emits light when the release button is pressed. When the subject is within the short range shooting limit of the camera lens 10, the IRED 2 stops the emission of light for the duration during which the short range optical system is moving. Immediately after the short range optical system completes moving, the IRED 2 emits light again, and focusing is effected by the correction optical system.

Also, when the subject is at a position falling on the infinite ∞ distance range and the IRED 2 is emitting light, when neither the position detecting sensor 4 for range finding nor the short range limit overrun sensor 5 receives the reflected light from the subject, the magnets Mg 1, Mg 2, Mg 3 do not operate, and the camera lens 10 is held still at the infinite ∞ distance. When the release switch S3 is turned to the ON position as the final step of the time of pressing the release button, the release signal is output from a delay circuit 27 through the OR gate 28, then, after focusing is completed, the shutter is released.

Hereunder, the operation of the above device as an embodiment of the present invention will be described.

Figure 3:
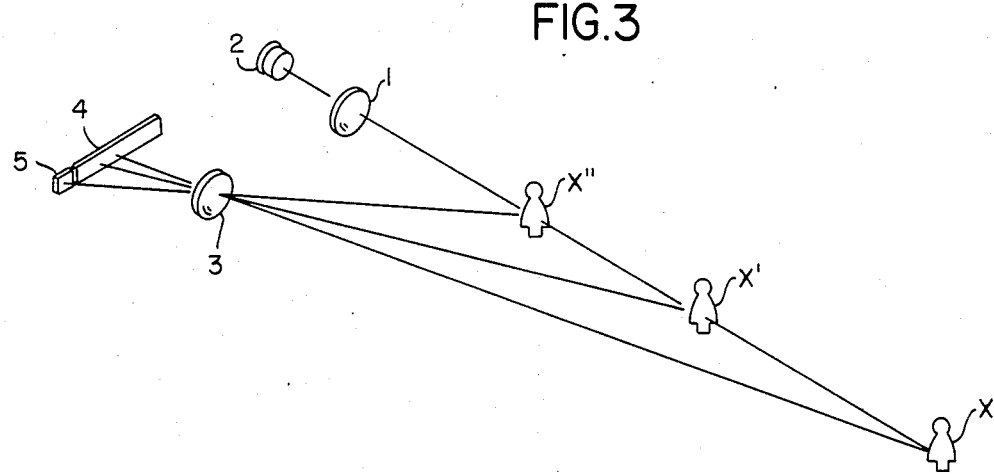
FIG. 3 is a diagram showing the subject approaching the lens after passing the range finding limit that is the short range shooting limit of the camera lens.
Figure 4:
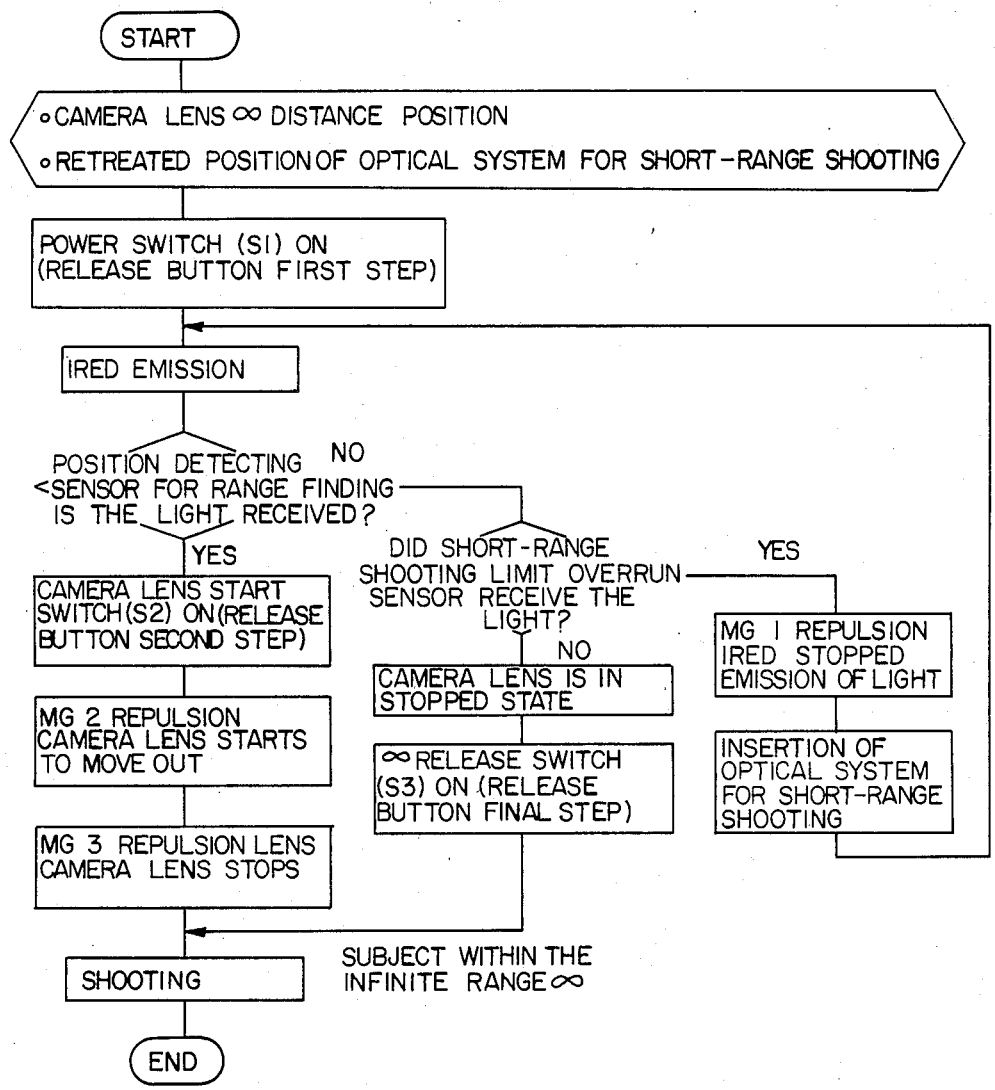
FIG. 4 is a flow chart briefly showing the operation of the device in FIG. 1.

FIG. 3 is perspective view showing the state when the subject X at the optional distance from the camera lens 10 moves and comes closer toward the camera lens 10 by passing the short range shooting limit of the camera lens 10, that is, the range finding limit of the lens. FIG. 4 is a flow chart showing an outlilne of operation of the device.

First, for photographing the lens 10 is brought in by connection with the shutter charge, etc. The camera lens 10 is set at the infinite ∞ distance position relative to the focal plane S, and enter this state by being attrcted by the repulsion magnet Mg 2.

Meanwhile, the sliding frame 20 for the correction lens system 17, 18, and 19 is anchored so as to be attracted at its end by the repulsion magnet Mg 1, while being kept in a state wherein it retreats from the respective optical axes of the camera lens 10, the finder objection lens 6, and the light receiving lens 3. At this time, the anchoring pawl 13 of the ratchet 11 is also anchored by being attracted by the repulsion magnet Mg 3.

Then, when the release button (not shown in the Figure) is pressed, the power switcth S1 is brought into the ON state, and the IRED 2 emits light by receiving the operation signal from the IRED driver 24 during the first step of pressing the release button.

In this case, as shown in the perspective view of FIG. 3, the light emitted from the IRED 2 becomes the light flux by passing through the projection lens 1, and after the beam strikes upon the subject, the reflected beam comes back to the range finding unit of the device. When the subject X is at the position within the shooting range of the camera lens 10, the reflected beam passes through the light receiving lens and converges to the position detecting sensor 4 for range finding. When the subject X comes closer to the camera lens, as shown by X', the reflected beam moves along the surface of the foregoing position detecting sensor 4. Then, when the subject X comes even closer to the camera lens by passing the range finding limit, that is, the short range shooting limit of the camera lens, as indicated by X", the reflected flux of light from the subject X' comes outside of the position detecting sensor 4 and converges on the surface of the short range limit overrun sensor 5 disposed adjacent to the position detecting sensor 4.

As the second step in the operation actuated by pressing the release button, the camera lens is turned to the ON position where the subject is within the normal shooting range and the range finding position detecting sensor 4 receives the reflected beam from the subject. As was described previously in the description of the circuit, in response to the magnet operation signal from the Mg 2 driver 22, the repulsion magnet Mg 2 releases the camera lens 10 from the engagement attracted by the repulsion magnet Mg 2. As a result, the camera lens 10 begins to be brought out from the infinite distance position that is the attracted position. Then, when the lens position voltage from the lens position voltage generating circuit 16 becomes equal to the voltage corresponding to the lens setting distance that is controlled by the signal from the position detecting sensor 4, the focusing state is obtained. At this time, the repulsion magnet Mg 3 releases the anchoring pawl 13 from the attraction to let the camera lens 10 stop at the focused position (focal point). Thereafter, by means of the release signal, the shutter operates, and shooting is carried out at the focusing postion.

When the subject passes the short range shooting limit of the camera lens 10 and comes to the close-up position indicated by X" in FIG. 3, the reflected beam from the subject converges to the surface of the short range limit overrun sensor 5. As mentioned previously in the description of the circuit, then the repulsion magnet Mg 1 operates by responding to the magnet operation signal from the Mg 1 driver 21. During the time when the foregoing operation signal is in effect, the emission of light from the IRED is stopped. Through the actuation of the magnet Mg 1 by the magnet operation signal as mentioned above, the sliding frame 20 with the short range optical system disposed in it is released from the attraction and engagement. Thus, the sliding frame slides. As shown in FIG. 2, the sliding frame 20 for the correction lenses 17, 18, and 19 moves in a manner that the lenses come to be in line with the optical axes 1₁, 1₂ and 1₃, respectively. Right after this, the IRED 2 emits light again, and the reflected beam from the subject is refracted by the incidence angle correction prims 19. After passing through the light receiving lens 3, it converges on the light receiving surface of the position detecting sensor 4 of the range finding unit.

Then, the ON state of the camera lens start switch S2 and the light receiving signal from the position detecting sensor 4 cause the repulsion magnet Mg 2 to release the camera lens 10 from the engagement effected by the attraction, so that the camera lens 10 is brought out. The position of the lens is output in a form of lens position voltage from the lens position voltage generating circuit 16. When this lens position voltage becomes equal to the voltage that corresponds to the lens setting distance for the camera lens 10 when this lens setting distance is corrected to be used for short range shooting, the focused state is obtained. The foregoing lens setting distance for the camera lens 10 is determined in response to the signal output from the postion detecting sensor 4. When the focused state is obtained as mentioned above, the repulsion magnet Mg 3 releases the anchoring pawl 13 from the enngagement letting the camera lens 10 stop at the focusing position. Thereafter, by means of the release signal, the shutter operates, and shooting is performed at this short range focused position.

In the case where the subject takes the position falling in the infinite range, even if the IRED 2 emits light, neither the position detecting sensor 4 of the range finding unit nor the short range limit overrun sensor 5 receives reflected light from the subject. Therefore, none of the respective repulsion magnets Mg 1, Mg 2 or Mg 3 operate and the camera lens 10 maintains the stopped state at the infinite distance position. Then, by the release signal which is given when the infinite ∞ release switch S 3 is brought to the ON position, which is the final step in pressing the release button, shooting is carried out.

In the embodiment shown above, the sliding frame 20 corrects the angle of incidence to the light receiving lens 3, and the parallex of the finder by altering the angle of incidence to the finder objective lens 6.

In the foregoing embodiment, the initial position of the camera lens at the time the release button is pressed is set at the ∞ distance position. It is also possible to set the initial position of the camera lens at the short distance position of the helicoid of lens, etc., and to effect the alteration by inserting the correction lens. It should be apparent that various changes and modifications my be made without departing from the spirit and scope of the invention thereof.

From the description above, while with conventional automatic focusing devices it is impossible to take photographs of a subject closer than the short range shooting limit due to the restrictions imposed by the helicoid of the camera lens, according to the present invention it is possible to take photographs in the close-up range between the subject and the camera lens. Also, parallex of the finder which occurs in close-up photography can be easily corrected. When the subject comes closer passing the short range shooting limit of the lens, shooting of the subject at the close-up distnace can be performed easily in continuation from the normal shooting mode without requiring any specific operation for the camera through automatically switching the range finding-focusing mechanism. Thus, the present invention contributes greatly to the expansion of the shooting range of an automatica focusing camera.

We claim:

1. An automatic focusing device equipped with close-up focal control function, comprising:
    a measuring means having a detection unit for detecting if the subject is beyond the short range shooting limit of a camera lens;
    camera lens distance setting means for setting the distance for the camera lens by means of the signal of the measured distance from the measuring means;
    optical correction means for respective optical systems, the optical correction means inserting a correction lens to the camera lens according to the detected signal signalling the object being in the short range shooting limit, said correction means also inserting at least an optical wedge to a range finding optical system; and
    distance measuring means for measuring the distance by an optical system corrected by said shooting limit exceeding detection signal, said automatic focusing device inserting the correction lens in line with the camera lens in accordance with the detection signal when a subject for shooting comes closer than the short range shooting limit of the lens and remeasuring the distance by at least correcting the incident light path of the range measuring optical system in order to set the shooting distance of the lens.

2. An automatic focusing device equipped with close-up focusing function according to claim 1, wherein said measuring means comprises:
    a light projecting means for projecting light to the subject;
    a light receiving lens for receiving the reflected beam from the subject, the receiving lens being disposed with a specified distance kept from said light projecting means;
    a first light receiving element disposed at where the beam coming through the light receiving lens converges, said light receiving element detecting the positional deviation of the converging point of the reflected beam on the light receiving surface;
    a second light receiving element which is a detection unit for detecting the overrun of the short range shooting limit, said second light receiving element being adjacent to the short range limit point in the deviation detection for the converging point on the light receiving element surface;
    a distance computing circuit for outputting distance signals obtained from the detected deviation; and
    said distance remeasuring means causing said beam emitting means to re-emit the light in linkage with the completion of said insertion of the correction lens.

* * * * *